United States Patent [19]

Nishijima et al.

[11] Patent Number: 5,061,922
[45] Date of Patent: Oct. 29, 1991

[54] METHOD OF MONITORING CHANGES OF STATE OF A POWER TRANSMISSION SYSTEM BY INTERRUPTION SIGNAL TRANSMISSION

[75] Inventors: Kazuo Nishijima, Katsuta; Terunobu Miyazaki, Ibaraki; Eisaburo Sakou, Hitachi; Tomoharu Nakamura, Hitachiota; Mitsuru Nakamura, Katsuta, all of Japan

[73] Assignee: Hitachi, Ltd., Tokyo, Japan

[21] Appl. No.: 340,470

[22] Filed: Apr. 19, 1989

[30] Foreign Application Priority Data

Apr. 22, 1988 [JP] Japan .................................. 63-99367

[51] Int. Cl.⁵ .............................................. H04Q 9/00
[52] U.S. Cl. ......................... 340/825.080; 340/825.12; 340/310 A; 370/95.2
[58] Field of Search ...................... 340/825.06, 825.08, 340/825.12, 825.13, 825.5, 825.51, 825.07, 825.21, 825.05, 825.14, 310 R, 310 A; 370/85.6, 85.8, 95.2, 85.4, 85.5, 85.7, 95.1

[56] References Cited

U.S. PATENT DOCUMENTS

| | | | |
|---|---|---|---|
| 4,586,040 | 4/1986 | Akiba | 340/825.08 |
| 4,609,920 | 9/1986 | Segarra | 340/825.51 |
| 4,740,787 | 4/1988 | Kimura | 340/825.08 |
| 4,742,335 | 5/1988 | Vogt | 340/825.08 X |
| 4,829,297 | 5/1989 | Ilg et al. | 340/825.08 |

FOREIGN PATENT DOCUMENTS 61-540 3/1986 Japan .

OTHER PUBLICATIONS

"Development and Field Test on a Distribution Line Carrier Communication System", Akira Miyahara, et al., IEEE Transactions on Power Delivery, vol. PWRD-1, No. 3, Jul. 1986, pp. 28-34.
"Development of Distribution-Line Information Transmission System", Akira Miyahara et al., Hitachi Hyoron, vol. 65, No. 6, (1983-6) pp. 385-390.

*Primary Examiner*—Donald J. Yusko
*Assistant Examiner*—Edwin C. Holloway, III
*Attorney, Agent, or Firm*—Antonelli, Terry, Stout & Kraus

[57] ABSTRACT

A signal transmission/monitoring method for a system including a master station and a plurality of slave stations installed on and along a signal transmission line so as to be capable of mutually performing information transmission and reception in such a manner that the master station calls the slave stations through sequential polling with the called slave station sending reply information to the master station. An interrupt enable time zone is provided between a time point at which the call signal transmission from the master station is completed and a time point at which the reply signal transmission from the slave station is started. When other slave station issues an interrupt request within the interrupt enable time zone, signal transmission to the master station from that other slave station is carried out with priority.

10 Claims, 8 Drawing Sheets

MASTER-TO-SLAVE POLLING TRANSMISSION FRAME

SLAVE-TO-MASTER REPLY TRANSMISSION

FIG. 4A SIGNAL TRANSMITTED 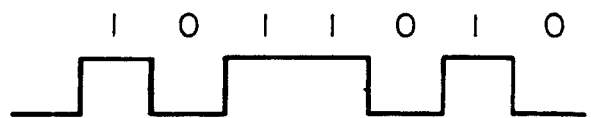
FIG. 4B ZERO-PHASE VOLTAGE Vo 
FIG. 4C SYNCHRONISM DETECTION OUTPUT 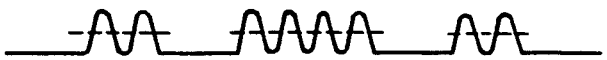
FIG. 4D DEMODULATED SIGNAL (RECEIVED) 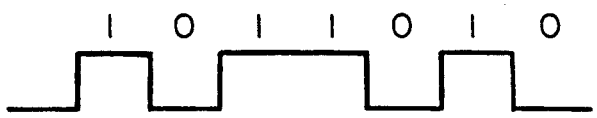

METHOD OF MONITORING CHANGES OF STATE OF A POWER TRANSMISSION SYSTEM BY INTERRUPTION SIGNAL TRANSMISSION

BACKGROUND OF THE INVENTION

The present invention generally relates to a signal transmission method. More particularly, the present invention is concerned with a method suited profitably for monitoring the state of a power distribution system in which a master station and a plurality of slave stations are interconnected by way of a power distribution line and in which transfers of information are performed sequentially between the master station and a plurality of the slave stations for the purpose of monitoring the state of the distribution system.

As an information transmission system for detecting and grasping the states of pole-mounted switches being distributed in a power distribution system, there can be mentioned a power line signal transmission system in which the power distribution system itself is used as a signal transmission line and a wired transmission system in which a dedicated transmission line is employed, as is described, for example, in "HITACHI HYORON", Vol. 65, No. 6 (1983-6) and others.

In a method of collecting the information concerning the state of the power distribution system by resorting to the use of the transmission system mentioned above, there is generally adopted a polling technique according to which a master station calls sequentially a plurality of slave stations placed under the control of the master station, wherein the state of the whole distribution system is grasped on the basis of the information sent sequentially from the slave stations.

The polling method requires an amount of transmission time which is in proportion to the number of the slave stations for obtaining the information from all the slave stations because the master station has to interrogate sequentially the slave stations one by one. By way of examples, when communication between the master station and one slave station requires a time of t seconds, then the time taken for communication between the master station and n slaves stations amounts to t×n seconds.

In general, a change of the state of the switches installed in the power distribution system (which is brought about by system failure, accidents and for other reasons) does not take place frequently. It is however a matter of great importance to detect as early as possible the change in the state of the switches in order to avoid inconvenience of the consumers brought about by the service interruption by taking the measures for the restoration speedily. As an approach for solving this problem, there may be mentioned, for example, an emergency interrupt transmission system disclosed in JP-A-61-61540.

In the emergency interrupt transmission system, a signal or information sent out by a given station is transmitted simultaneously to all the stations installed in the transmission system of concern, wherein all the stations are implemented on the basis of the same transmission principle, as with the case of the power line transmission system. The emergency interrupt transmission system is characterized in that a slave station which detects a change of state of the associated switch and hence must inform the situation immediately to the master station is allowed to issue an interrupt request in synchronism with the calling or polling of the master station for the slave stations. Consequently, the signal sent out from the master station may conflict with the interrupt signal issued by the slave station which detected the change of the state, whereby the signal outputted by the master station may undesirably be prevented from being correctly transmitted as intended by the master station. In such case, the slave station as called may decide that the incoming signal from the master station is invalid and issue no reply. On the other hand, the master station may decide that the interrupt signal overlaps the signal sent out therefrom and assume the send-by state waiting for the information from the slave station which issued the interrupt signal. Subsequently, the slave station which detected the change of the state can transmit the relevant information toward the master station. The prior art system suffers a drawback in that because the master station may erroneously take the error in the signal sent therefrom for the occurrence of emergency information transmission from an unspecified slave station, there may arise undesirably an unnecessary stand-by state upon occurrence of transmission failure (such as caused by a lighting stroke to the distribution system), while the error due to the failure may erroneously be recognized as emergency information.

SUMMARY OF THE INVENTION

An object of the present invention is to provide an information transmission method which is capable of detecting rapidly and reliably the generation of emergency information in the course of monitoring of the slave stations by the master station through a polling process.

In view of the above object, there is provided according to an aspect of the present invention a monitoring method for a system in which a plurality of slave stations for monitoring at least the operating states of associated pole switches and a master station for monitoring the states of the slave stations are installed on and along a distribution line and interconnected by the distribution line, wherein an interrupt enable time zone is provided between a time zone in which a call command for designating the slave station is generated by the master station and a reply time zone in which the particular slave station designated by the call command sends information of its own state as a reply to the call of the master station, and wherein when at least one slave station in a group of the slave stations has it state changed after issuance of the call command, that one slave station is allowed to issue an interrupt request within the abovementioned interrupt enabling time zone, whereon upon appearance of the interrupt request within the interrupt enable time zone, sending of information of the slave station which issued the interrupt request is allowed to be performed with priority over the information sending by the particular slave station from the beginning of the interrupt enable time zone, while the sending of information of the particular slave station is delayed at least until the time the next call command is issued to the particular slave station by the master station. Further, according to another aspect of the invention, it is proposed to divide the interrupt enable time zone into a plurality of time sub-zones which are correspondingly related to types of changes in the state of the slave station, and to allocate to the types of the state changes priority levels in a sequential order to thereby allow the slave station which has undergone a change of state to issue interrupt requests, respectively, in the order of high to low priority levels assigned to the changes of state, so that upon issuance of the interrupt request from a given one of the slave stations which has undergone a change of the state assigned with a high priority level, the sending of information to the master station from the given slave station is performed with priority, while the sending of information to the master station from the slave station which has undergone a state change assigned with a lower priority level is delayed at least until the next call command is issued thereto. Additionally, according to a further aspect of the invention it is proposed that the priority level assigned to the change of state of the slave station brought about by changing over of the associated pole switch from the open state to the closed state is set higher than the change of state of the slave station brought about by transition from a service interruption state to a service restoration state. The present invention further teaches that when the pole switch is automatically thrown into operation upon transition of the associated slave station from the service interruption state to the alive state, the associated slave station is forcibly caused to stop issuance of the interrupt request brought about by the service interruption.

When a change in state takes place in a given one of the plural slave stations in the course of transfer of information between the master station and a specific or particular slave station as called, the given slave station issues an interrupt request within the interrupt enable time zone following the time zone in which the call command is issued by the master station. In that case, the information transmission from the given slave station which issued the interrupt request is performed, starting from interrupt enable time zone with priority over the information transmission by the particular slave station, which in turn is delayed until the next call is issued thereto by the master station.

Further, when changes of state occur in a plurality of the slave stations, the issuance of interrupt requests is sequentially permitted, starting from the slave station which has undergone a change of state assigned with the highest priority level in the decending order, whereon the information transmission by the slave station mentioned above is performed with priority over other slave stations, while the information transmission by the slave station which has undergone a change of state assigned with a lower priority level is delayed until the next call is issued by the master station.

In a preferred embodiment of the invention, when there exist a plurality of the slave stations in which changes of state take place, a higher priority for the information transmission to the master station is given to the slave station where the change of state has been brought about by transition from the OFF-state to the ON-state rather than the slave station whose state has been changed from the service-interrupted state to the restored state.

In another preferred embodiment of the invention, when the states of the individual slave stations have changed from the dead state to the alive state with the associated pole switches being automatically closed, the interrupt request is forcibly inhibited from being generated.

By virtue of such a feature of the present invention that when a given one of the slave stations has undergone a change of state even in the course of information transfer between the master station and a particular or specific slave station, the given slave station issues an interrupt request within the interrupt enable time zone, whereupon the information transmission by the given slave station is performed with priority over the particular slave station, whose information transmission is delayed until the next call is issued by the master station, it is possible to inform immediately the master station of the change of state taking place in a slave station even when the master station is performing communication with another slave station. In this manner, the change in the state of the distribution system can be detected instantaneously. Further, when a plurality of slave stations change states the relevant information is sequentially transmitted to the master station, starting from the slave station which has undergone the change of state assigned with the highest priority, whereby the changes in the state of the plural slave stations can be detected at a high speed. In this conjunction, it is noted that importance may be put on the information transmission by the slave station subjected to the change in state which is serious for the proper operation of the distribution system, so that the serious change in the state of the system can be instantaneously detected. Besides, when the pole switches become alive from the dead states, the interrupt request by the associated slave stations due to the restoration is forcibly inhibited, whereby simultaneous generation of both the interrupt requests due to the restoration and the automatic closing of the pole switch is prevented, which is advantageous in that the delay otherwise involved in the communication between the master station and the slave station due to the interrupt request can be avoided.

BRIEF DESCRIPTION OF THE DRAWINGS

FIGS. 4A to 4D are waveform diagrams of major signals utilized in the transmission system shown in FIG. 3;

DESCRIPTION OF THE PREFERRED EMBODIMENTS

Now, the present invention will be described in detail in conjunction with preferred and exemplary embodiments thereof by reference to the drawings.

Figure 1:
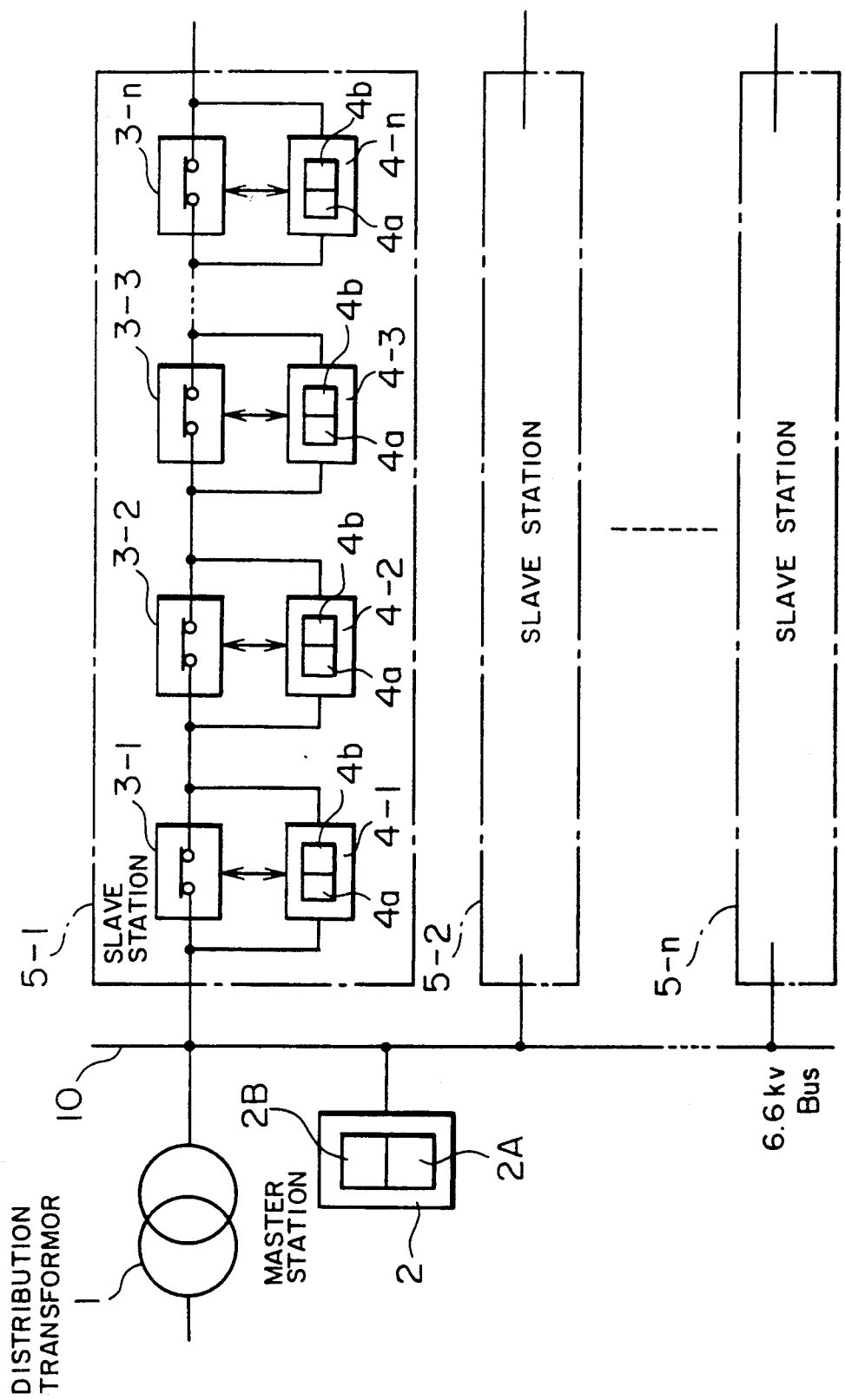
FIG. 1 is a schematic block diagram showing a general arrangement of a distribution system to which the signal transmission method according to the present invention can be applied.

FIG. 1 is a schematic diagram showing a general arrangement of a signal transmission system to which the transmission method according to the present invention can be applied.

Referring to FIG. 1, a reference numeral 1 denotes a distribution transformer having a secondary side connected to a high-voltage distribution bus line 10 (6.6 KV BUS) to which there are connected distribution systems 5-1, 5-2, . . . , 5-n and a master (host) station 2 for supervising or monitoring the states of the individual distribution systems. Each of the distribution systems includes pole-mounted switches (also referred to as pole switches) and a group of slave stations. Explaining by taking as an example the distribution system 5-1, this system 5-1 includes the pole switches 3-1, . . . , 3-n and the slave stations 4-1, . . . , 4-n. The master station 2 and the individual slave stations 4-1, . . . , 4-n are interconnected by way of the distribution line 10, wherein a power line signal transmission system is realized in such a manner that information or data can be transferred between the master station 2 and the slave stations 4-1, . . . , 4-n by way of the distribution line 10 serving also as a signal transmission line. The master station 2 includes a control unit 2A arranged to output various commands (supervisory, control, measure and other commands for monitoring the slave stations and a junction or trunk unit 2B for injecting the abovementioned various commands to the distribution line 10 and extracting the signals therefrom under the command of the control unit 2A. On the other hand, the slave stations 4-1, . . . , 4-n include controllers 4a designed to serve for monitoring the states of the associated pole switches 3-1, . . . , 3-n and others, respectively, for thereby generating reply information concerning the changes in the states of these pole switches and junction or trunk units 4b for injecting the signals to the distribution line 10 and extracting the signals therefrom.

Figure 2A:
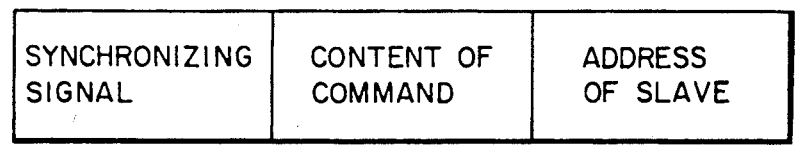
FIGS. 2A and 2B are views for illustrating format structures, respectively, of a polling or call transmission frame sent out by a master station to slave stations and a reply transmission frame sent out by slave stations in carrying out the transmission method according to the present invention.
Figure 2B:
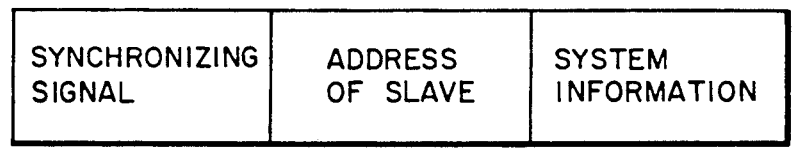

The master station 2 issues to the slave stations a call command in the form of an information frame containing a synchronizing signal, the content of the command and a slave station address, as is illustrated in FIG. 2A. On the other hand, in the transmission of the reply information to the master station 2 from the slave stations, there is employed a reply information frame which includes a synchronizing signal, a slave station address and system information, as is illustrated in FIG. 2B. The synchronizing signal can be generated by a zero-phase carrier transmission system, wherein one cycle of the power source frequency is allocated to the information of one bit in the case of the illustrated embodiment. For transmitting and receiving the synchronizing signal from and by the master station and the slave stations, there are provided in the master station 2 and each, of the slave stations 4-1, . . . , 4-n a transmitter part including transmission switching unit 22 for connecting the A-phase line of the distribution bus line 10 to ground by way of a capacitor 21, and a receiver part including capacitor division circuits 24 and 25, a vector synthesizing circuit 26, and product determination arithmetic units 27 and 28, as is shown in FIG. 3.

Figure 3:
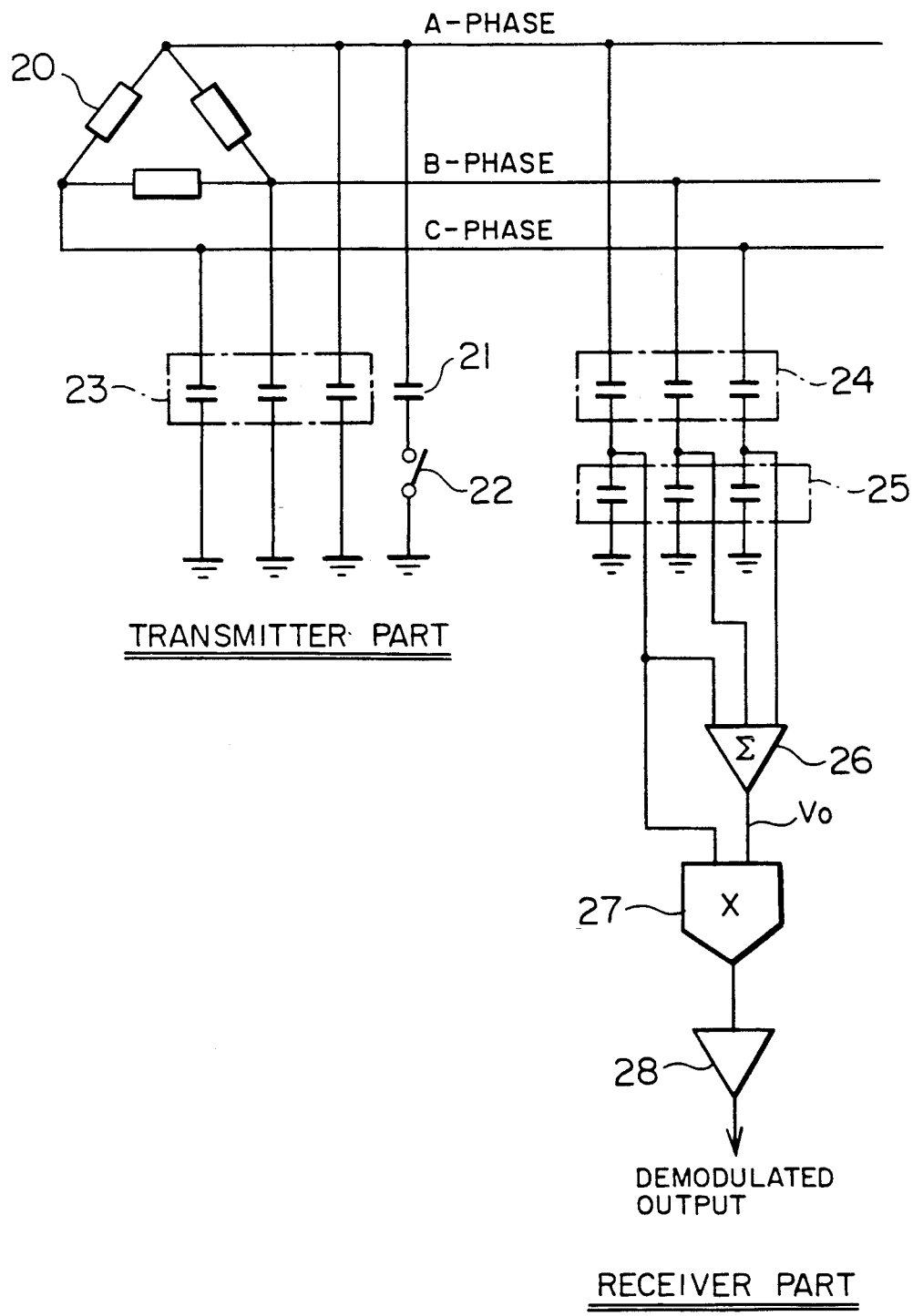
FIG. 3 is a schematic circuit diagram showing a structure of an apparatus for realizing the transmission method according to the present invention in accordance with the concept of the zero-phase carrier transmission system;.

When a signal is to be transmitted through the zero-phase carrier transmission system with the distribution transformer 20 being on the side of the transmitter part, as is shown in FIG. 3, a transmission signal having a waveform such as illustrated in FIG. 4A is sent out onto the distribution line 10 in ;correspondence with the switching operations for intermittently connecting one (e.g. A-phase) of the three phases of the transmission line 10 to ground by means of the switching unit 22 through the capacitor 21 of small capacity. More specifically, by inserting the capacitor 21 intermittently between the A-phase of the distribution line 10 and ground (earth) through the abovementioned switching operation in synchronism with the system frequency illustrated in FIG. 4C, the electrostatic capacity only for the A-phase of the electrostatic ground capacitances 23 which are otherwise in the balanced state undergoes a small change, as the result of which the zero-phase voltage of the distribution system is changed, which is then transmitted to the receiver part in the form of changes in the zero-phase voltage. At the receiver part, the ground three-phase voltage is detected by means of the capacitor division circuits 24 and 25. Thus, a zero-phase voltage $V_0$ can be derived through the vector synthesizing circuit 26. Referring to FIG. 4B, this zero-phase voltage $V_0$ ordinarily assumes a value approximating zero. Accordingly, by extracting only the change in the zero-phase voltage $V_0$, there can be made available a signal of a high S/N ratio. Further, with a view to improving the reliability of the signal transmission, the zero-phase voltage $V_0$ is multiplied in the product determination circuit 27 with the ground voltage of the A-phase serving as the reference phase, whereby an output signal can be derived which includes a DC component and a second harmonic component. By removing the AC component from this output signal by means of a filter 28 to thereby extract only the DC component, a reception signal of the same waveform as that of the transmitted signal (FIG. 4A) can be obtained through demodulation, as is illustrated in FIG. 4D.

By realizing the transmission and reception timing with reference to the system frequency serving as the reference clock in this way, the system synchronization can be established without difficulty. Thus, when the master station 2 sends a call to two particular slave stations during polling, these slave stations can simultaneously receive the call. However, the timing for generation of the reply information by the designated particular slave stations can be managed or controlled by the master station.

According to the teaching of the present invention, the command content of the transmission frame includes a command for delaying a time at which a particular slave station designated by the master station 2 sends the reply information for thereby allowing an interrupt enabling time zone to be interposed between a time zone in which the call command for designating the particular slave station by the master station 2 and a reply time zone in which the designated particular slave station sends the reply information concerning the state thereof to the master station. Further, it is taught according to another aspect of the present invention to divide the interrupt enable time zone into a plurality of sub-zones. In that case, these sub-zones can be utilized for identifying the correspondences with the types of the changes of the states of the slave station. Besides, the types of the changes of the states of the slave station can be assigned with priority levels in a predetermined order so that the interrupt requests issued by the slave stations are allowed in the order of the priority levels, starting from the change of state assigned with the highest priority. In this conjunction, the order of the priority levels assigned to the changes of the states of the slave stations may be so established, by way of example, that the change of the state brought about by the change-over of the pole switch of the slave station to the ON-state from the OFF-state is assigned with the highest or first priority, while the change of the state from the service-interrupted state to the service-restored state of the slave station is assigned with the second priority. It should further be mentioned that the command content mentioned above may include information for allowing a given one of the slave stations which has undergone a change of state to issue an interrupt request within the interrupt enabling time zone and at the same time delaying the reply transmission from the designated particular slave station until the subsequent call is issued. This information can be encoded appropriately. The slave station address field of the frame shown in FIG. 2A contains the address information for designating a particular one of the slave stations. Finally, the system information field of the reply transmission frame shown in FIG. 2B contains various system information inclusive of the information of the change of state brought about by the pole switches, the change-over of the state from the service-interrupted to the service-restored state of the slave station and the measured values of electric quantities in each of the slave stations.

Figure 5:
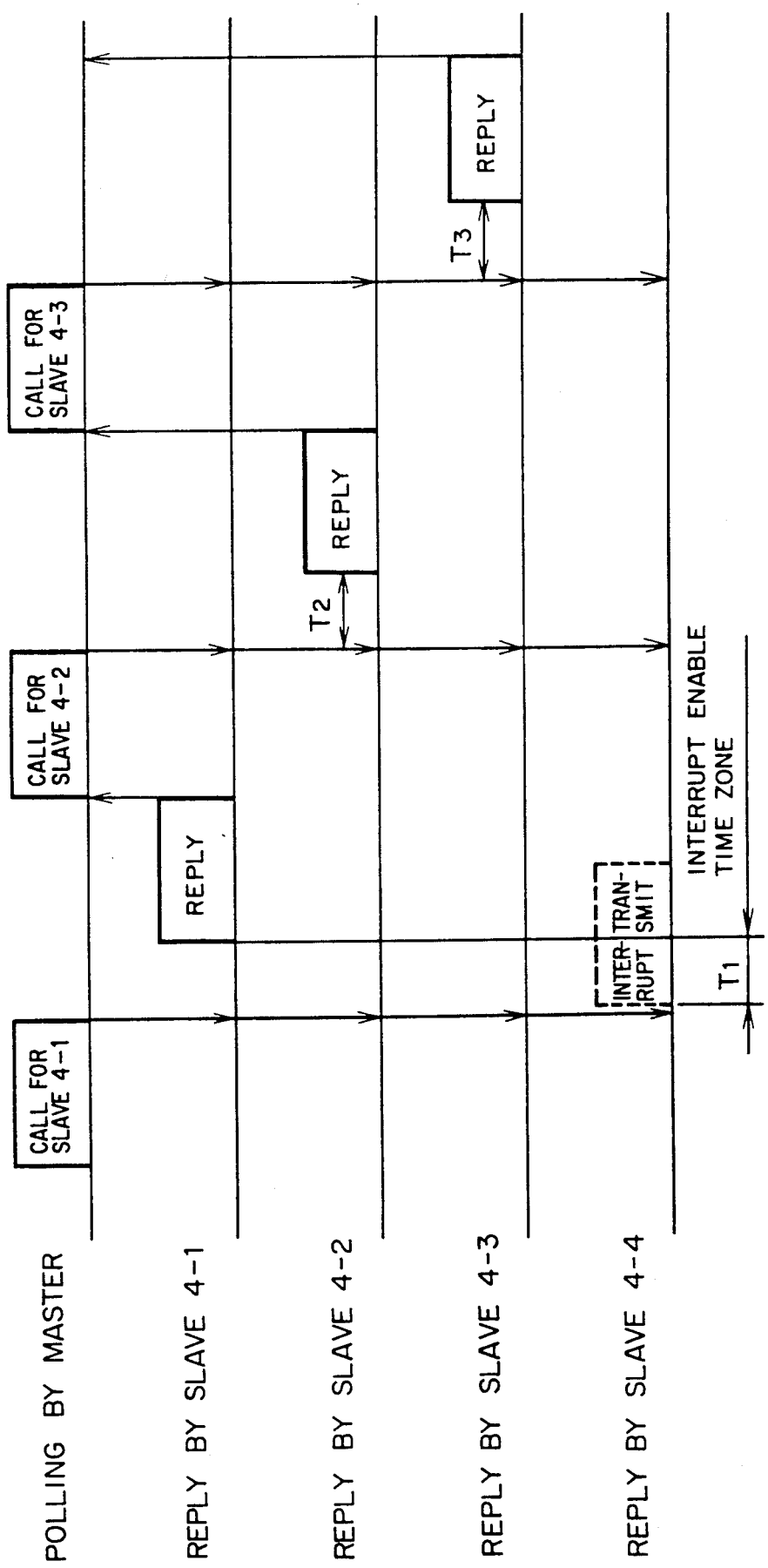
FIG. 5 is a time chart useful for explaining operation of the transmission method according to an embodiment of the present invention.

With the structure described above, transfer of information between the master station 2 and the individual slave stations 4-1, ..., 4-n is performed in such a manner as described below by reference to FIG. 5. When the master station 2 issues the call command to the slave station 4-1, the latter replies thereto by sending to the former the information concerning its own states after lapse of the interrupt enabling time zone $T_1$, provided that no state changes have taken place in the other slave stations. Subsequently, upon issuance of the call to the slave station 4-2 from the master station 2, the former responds thereto by sending to the latter as the reply a variety of information concerning the states of the slave station 4-2 after lapse of the interrupt enable time zone $T_2$ so far as no change in the state has occurred in the other slave stations. Similarly, when them aster station 2 issues the call command to the slave station 4-3, the latter sends as the reply various information after the lapse of the interrupt enable time zone $T_3$.

On the other hand, assuming that at the time point when the master station 2 issues the call to the slave station 4-1, the interrupt request is generated by the slave station 4—4 within the interrupt enable time zone $T_1$ because of the state change brought about by the closing (ON) of the pole switch, then the reply send operation of the slave station 4—4 is given priority over the reply operation of the slave station 4-1, whereby the interrupt reply transmission by the slave station 4—4 is allowed to be executed following the interrupt enable time zone $T_1$, while the reply transmission by the slave station 4-1 is delayed until the next call command is issued. In this manner, even where the information transfer is to be executed between the master station 2 and the slave station 4-1, the change in the state of the other slave station 4—4, if occurred, is instantaneously transmitted to the master station 2.

Figure 6:
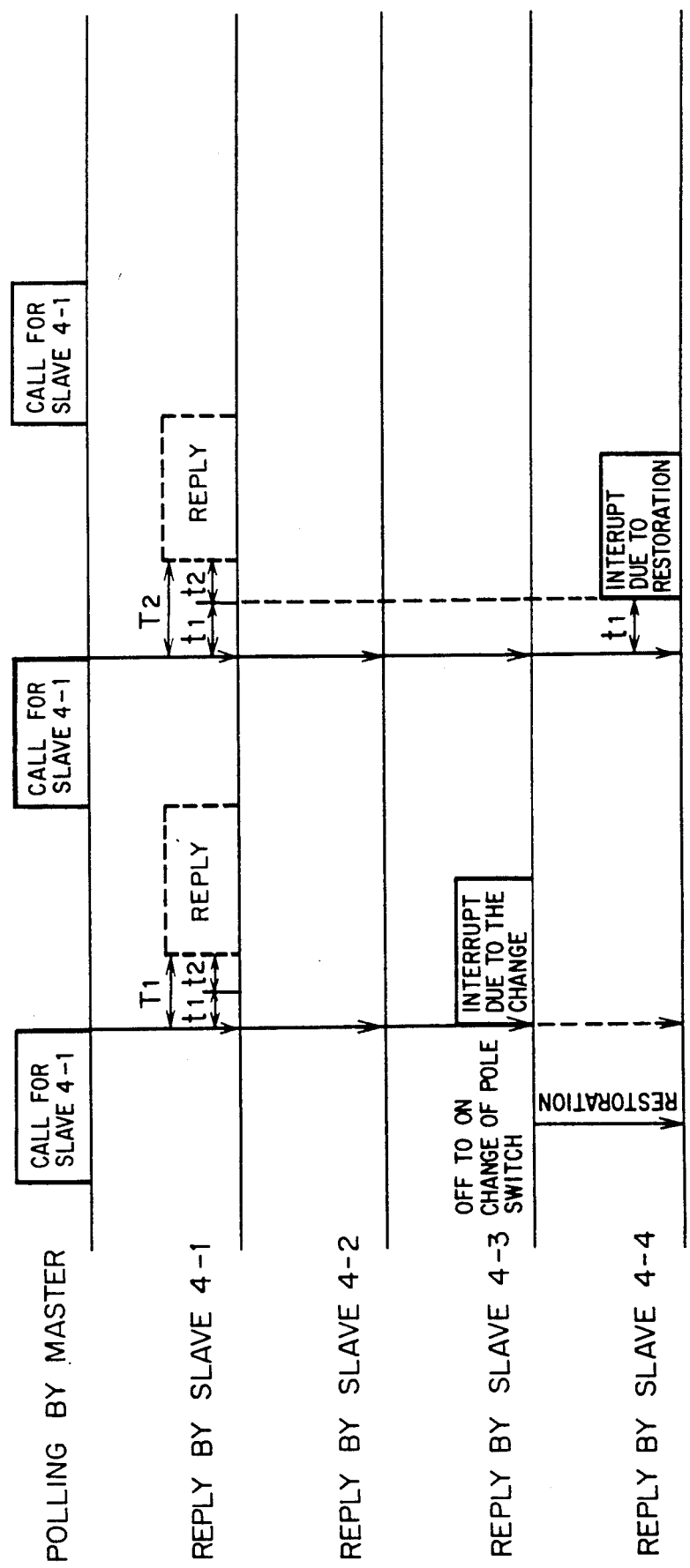
FIG. 6 is a time chart useful for explaining operation of the transmission method according to another embodiment of the present invention.

Next, the system operation will be described by reference to FIG. 6 in conjunction with the case where each of the interrupt enable time zones $T_1$, $T_2$ and so forth is divided into a plurality of time sub-zones $t_1$, $t_2$ and so forth (two sub-zones in the case of the illustrated embodiment), wherein the time sub-zone $t_1$ is assigned to the state change of the pole switch from the OFF-state to the ON-state, while the time sub-zone $t_2$ is associated with the state change of the slave station from the service-interrupted state to the service-recovered state.

Assuming now that when the master station 2 issues a call command to the slave station 4-1 and the latter is going to send back the reply information to the former, an interrupt request is issued by the slave station 4-3 within the interrupt enable time zone $T_1$ because of the state change of the associated pole switch having been changed over to the ON-state from the OFF-state. Then, the interrupt reply transmission from the slave station 4-3 is started in the interrupt enabling time sub-zone $t_1$, while the reply transmission of the slave station 4-1 is delayed until the next call command is issued by the master station 2.

Again assuming that when the master station issues subsequently the call command to the slave station 4-1, the slave station 4—4 has undergone the state change from the service-interrupted state to the service-recovered state. Then, the slave station 4—4 issues the interrupt request within the time sub-zone $t_2$ of the interrupt enable time zone $T_2$, whereupon the interrupt reply transmission is performed to the master station 2 from the slave station 4—4 in the sub-zone $t_2$, while the reply transmission by the slave station 4-1 is delayed until the next call is issued by the master station 2.

As will be appreciated from the above description, even when the information transfer is to be performed from the slave station 4-1 to the master station 2, occurrence of the state changes in other slave stations 4-3 and 4—4 interrupts the information transfer from the slave station 4-1 to thereby allow the state change information to be sent to the master station 2 from the slave stations 4-3 and 4—4 in the sequence conforming to that of the priority levels assigned to these state changes. In other words, even when the master station is to receive the state information from the particular one of the slave stations as designated by the master station, occurrence of the state changes in the other slave stations can instantaneously be messaged to the master station 2 to allow these state changes to be detected by the master station.

Since a plurality of information concerning the states changes in the slave stations are not simultaneously transmitted to the master station but sent to the latter in a predetermined sequence, it is possible to detect with an improved reliability the states of those slave stations which have undergone the state changes.

In the case where each of the interrupt enable time zones $T_1$, $T_2$ etc. is divided into the sub-zones $t_1$, $t_2$ etc., the duration of the sub-zone t may be selected to be sufficiently long for receiving the synchronizing signal. By selecting the time sub-zone t twice as long as the time taken for receiving the synchronizing signal, the interrupt can be generated at two consecutive steps. It should however be understood that the interrupt enable time zone may be selected sufficiently long for receiving the whole reply information frame. In that case, after lapse of the interrupt enable time zone, the slave station as polled can send the reply information.

In conjunction with the detection of the change in the state of each slave station, it is possible to detect in addition to the voltage value and the current value the failure or malfunction of palette contacts (auxiliary contacts) of the pole switch.

Further, when a main switch inserted between the distribution transformer 1 and the individual distribution systems 5-1 to 5-n is changed over from the OFF-state to the ON-state to thereby change over the pole switches of each distribution system from the service-interrupted state to the alive state to thereby allow the pole switches of the slave station to be automatically closed, it is necessary to suppress forcibly the interrupt request issued due to the service restoration of the slave station, because otherwise the interrupt request due to the service restoration will be issued in overlap with the interrupt request due to the automatic closing of the pole switch.

A supervisory method according to the present invention will be described in detail by reference to a time chart shown in FIG. 7 and flow charts shown in FIGS. 8 and 9.

Figure 7:
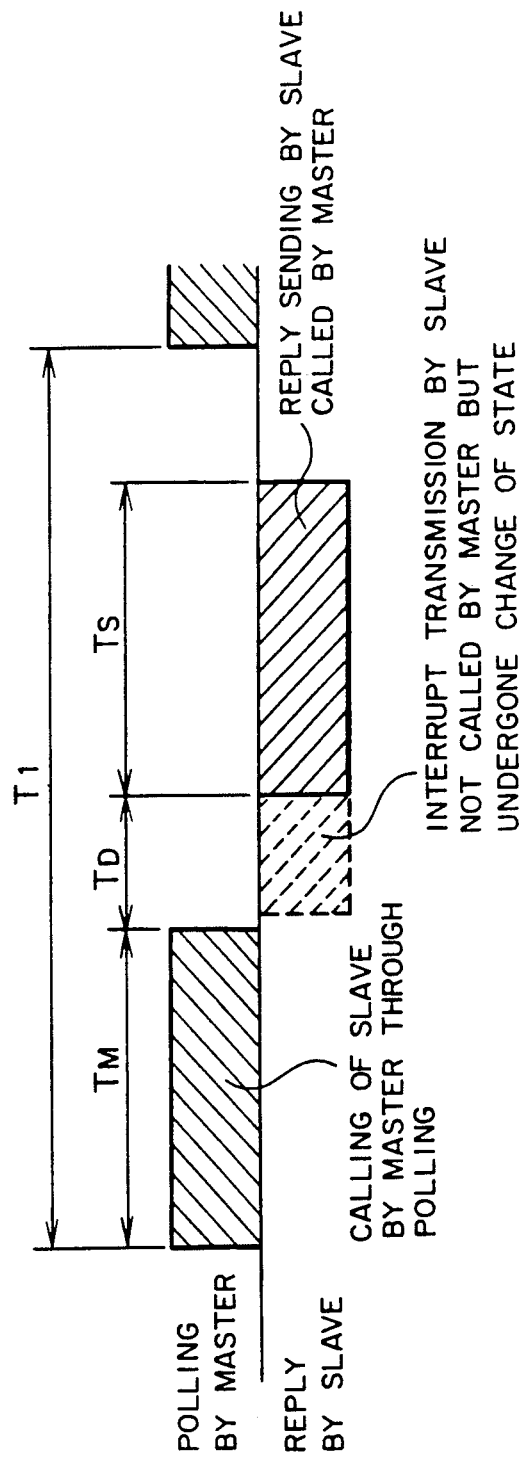
FIG. 7 is a time chart useful for explaining operation of the transmission method according to the present invention in further detail.

Referring to FIG. 7, the master station monitors the slave or local stations by polling at a periodic interval of $T_1$ seconds. In this figure, $T_M$ represents a time (in second) taken for a master station to transmit a monitoring command, $T_D$ represents a time (in second) for a slave station to perform the reply transmission at the end of the transmission from the master station, and $T_S$ represents a time taken for the called slave station to complete the reply transmission. Additionally, the period $T_D$ represents the interrupt enable time zone within which the other slave station(s) than the called one is allowed to start the interrupt transmission upon detection of the change in the state.

Figure 8:
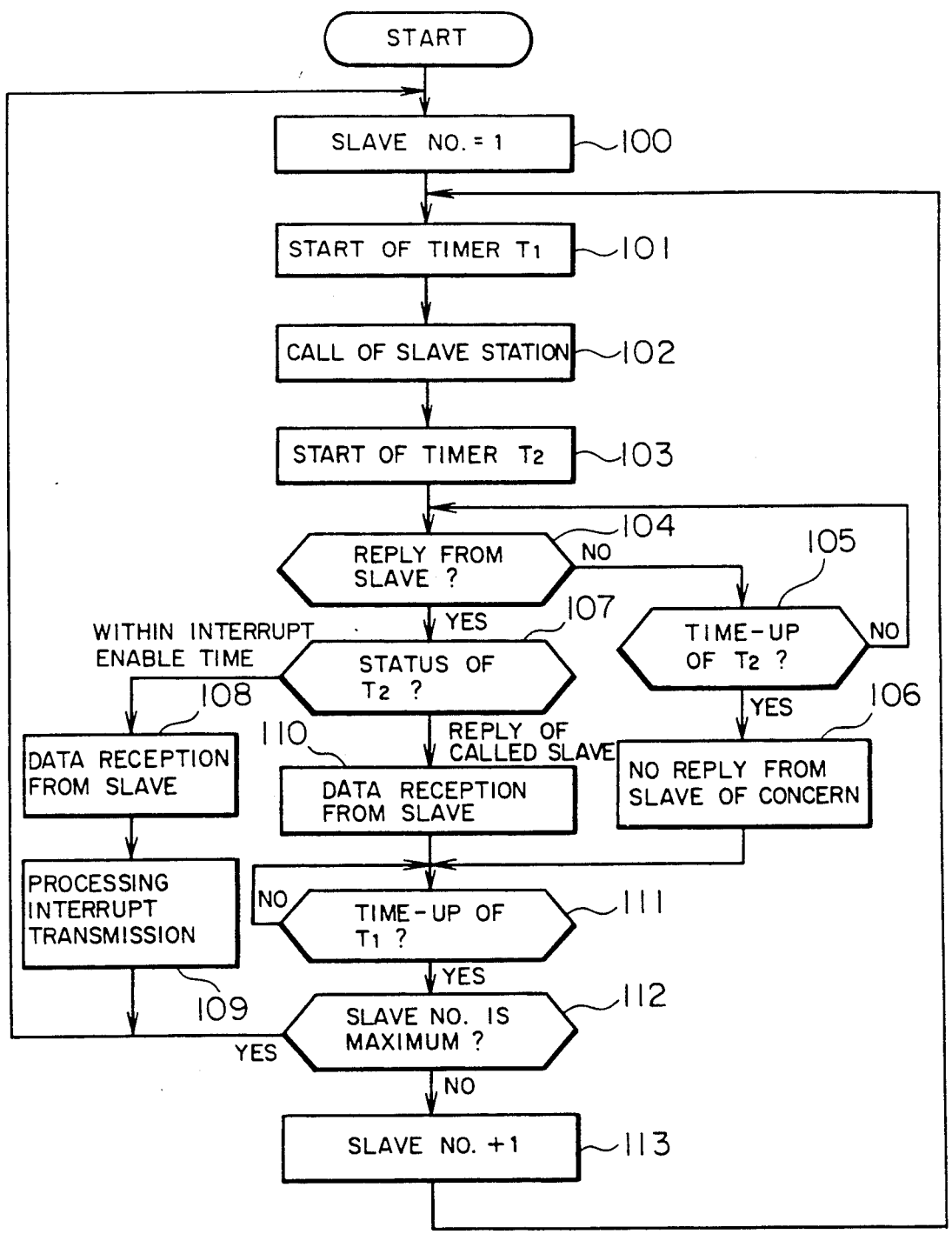
FIG. 8 is a flow chart useful for explaining in further detail the operation for transmission performed by the master station on the basis of the concept illustrated in FIG. 7.

FIG. 8 is a flow chart illustrating a monitoring or supervising process executed by the master station. Referring to the figure, the identification number of the slave station to be first monitored is set at a step 100, being then followed by a step 101 at which a timer $T_1$ for managing the period in which the slave station of concern is called is activated. Then, at a step 102, the processing for the transmission of the call for the slave station of concern is executed. Upon completion of the call transmission processing at the step 102, a timer $T_2$ for managing the period in which the slave station of concern can start the reply transmission is activated. The timer $T_2$ is referred to for making decision as to occurrence of the interrupt as well as presence or absence of the reply from the called slave station. Upon starting of the timer $T_2$ at the step 103, the presence or absence of the reply from the slave station to which the call has been issued is decided at a step 104. When it is decided at the step 104 that no reply is issued by the slave station as called at the step 104, it is then decided at a step whether or not the time set at the timer $T_2$ activated at a step 103 has elapsed or not. When the lapse of the time set at the timer $T_2$ is detected at the step 105, then it is determined that the called slave station has issued no reply or response.

On the other hand, when it is decided that the reply is issued by the slave station at a step 104, then, decision is made at a step 107 as to whether or not the timing at which the slave station starts the reply transmission lies within the interrupt enable time zone. When the decision at the step 107 results in the affirmative (YES), data from the that slave station is received. Upon reception of the data from this slave station at the step 108, the processing for disposing of the interrupt of the slave station is executed at step 109. This interrupt processing includes a variety of processings such as generation of alarm, call of the slave station located adjacent to the interrupt issuing station, waiting for information concerning the measures taken by operator and so forth.

On the other hand, when it is decided at the step 107 that the reply transmission start timing is beyond the interrupt enabling time zone, it is decided at a step 110 that the reply message as received originates in the called slave station, whereupon the data from that slave station is received. Following the reception of the data from the slave station of concern at the step 110, it is checked at a step 101 whether the period set at the timer $T_1$ has elapsed (time-up) or not. When the "time-up" decision is resulted from the step 111, then it is decided at a step 112 whether or not the slave station number is the final value. If the decision at the step 112 is negative, the slave station number is incremented by 1 (one).

When the decision at the step 106 in the flow chart shown in FIG. 8 results in that no response is made by the slave station, a repeated call transmission processing (retry processing) is executed. Additionally, upon reception of erroneous or false data from the slave station at the steps 108 and 110, the retry processing is performed as well. However, since the retry processing is irrelevant to the essence of the present invention, any further description of this processing will be unnecessary.

Figure 9:
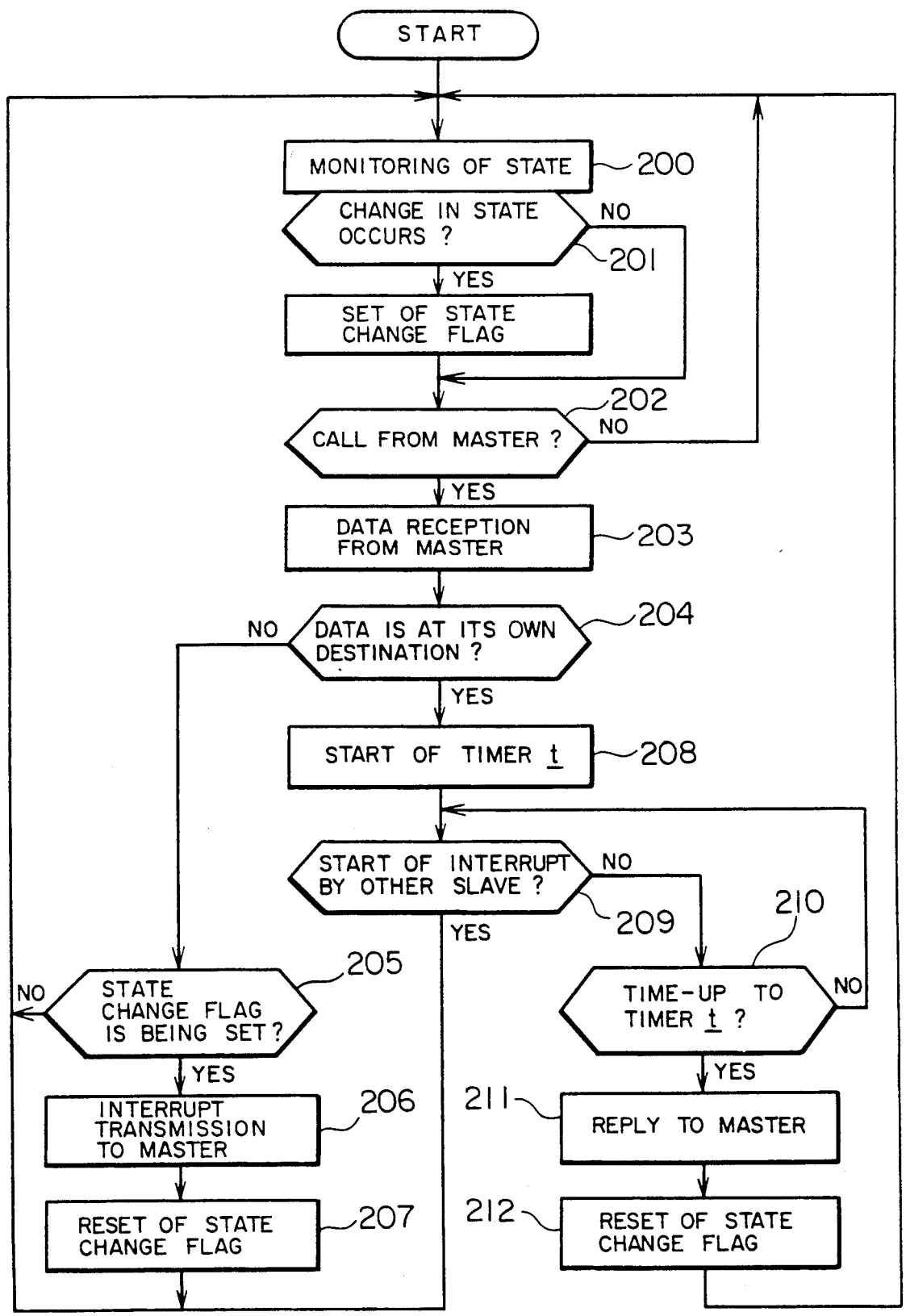
FIG. 9 is a flow chart useful for explaining in further detail the operation for transmission performed by the slave station on the basis of the concept illustrated in FIG. 7.

FIG. 9 is a flow chart for illustrating the information transmission processings executed by the slave station. At a step 200, the switch state and the measured values of the electric quantities are constantly monitored. Upon detection of change in the state of the switch and others at the step 200, a "state change flag" is set in order to transmit the relevant information immediately to the master station. After the setting of the "state change flag" at the step 201, it is constantly monitored at a step 202 if there is issued the call to the slave station of concern from the master station. When the presence of the call from the master station is detected, data from the master station is received at once at a step 203, being then followed by a decision step 204 for deciding whether the received call is for its own destination. If not, it is then checked at a step 205 whether the "state change flag" is being set or not. If the flag is set, the interrupt transmission to the master station is started at a step 206. Upon completion of the interrupt transmission, the "state change flag" is reset at a step 207, whereupon the slave station resumes the stand-by state.

On the other hand, when it is decided at the step 208 that the master call is for its own destination, a timer t for measuring the interrupt enable period is started for monitoring occurrence of the interrupt transmission by another slave station. Subsequently, at a step 209, a decision is made as to whether or not the interrupt transmission by other slave station has been started. If the decision step 209 is negative (NO), it is then checked at a step 210 whether or not the period set at the timer t has lapsed (time-up). Upon detection of the time-up of the timer t at the step 210, its own information is transmitted to the master station as a reply to the call. Subsequently, the "state change flag" is reset at a step 212, whereupon the slave station under consideration resumes the stand-by state.

FIG. 9 shows a flow chart for illustrating the basic concept underlying the information transmission. However in order to enhance the reliability in conjunction with the system implementation, it is preferred that upon completion of the interrupt transmission to the master station at a step 206, the "state change flag" is not reset automatically but allowed to be reset only when the call issued by the master station is by the slave station which is the destination of that call, for thereby ensuring the confirmation by that slave station that its interrupt transmission to the master station has been achieved successfully.

We claim:

1. A signal transmission method for a system in which a master station and a plurality of slave stations are installed on and along a signal transmission path so as to be capable of performing mutual transmission and reception of information comprising the steps of:

periodically transmitting a polling message, including a slave station address and a command, from said master station to respective slave stations in a predetermined sequence;

responding in a slave station to a receipt of a polling message directed to that slave station from said master station by sending a reply message, including its own slave station address and station information, to said master station a predetermined time after the polling message transmission from said master station is completed, wherein an interrupt enabling time zone is provided between a time point at which a polling message transmission from said master station is completed and a time point at which a reply message transmission from the slave station called by said master station is started; and sending an interrupt reply message, including a slave station address and station information, during said interrupt enabling time zone from another slave station to which the transmitted polling message is not directed, so that upon issuance of said interrupt reply message by said other slave station within said interrupt enable time zone, the signal transmission from said other slave station which issues the interrupt reply message is permitted prior to that from said one slave station which has received a polling message directed to it.

2. A signal transmission method for a system in which a master station and a plurality of slave stations are installed on and along a signal transmission path so as to be capable of performing mutual transmission and reception of information in such a manner that said master station periodically calls said slave stations through sequential polling, comprising:

a first step in which, when one of said slave stations is called by said master station, the slave station address and information of said one slave station is sent out after lapse of a first time duration following the reception of the call signal from said master station;

a second step in which, when said one slave station is called, the slave station address and information of another slave station other than a said one slave station is sent out when a second time duration set shorter than said first time duration has lapsed from the reception of the call signal; and a third step in which, when information of said other slave station is sent out while said one slave station is being called, sending of the information of said one slave station is delayed until after receipt of a next call from said master station to said one slave station.

3. A monitoring method for a system in which a plurality of slave stations for monitoring at least the operating states of associated pole switches and a master station for monitoring the states of said slave stations are installed on and along a power distribution line and are interconnected by said distribution line, comprising the steps of:

providing an interrupt enable time zone between a time zone in which a call command for designating a particular slave station is generated by said master station and a reply time zone in which the particular slave station designated by said call command sends information of its own state as a reply to said master station; and when at least one other slave station, other than said particular slave station, in a group of the slave stations has its state changed after issuance of said call command to said particular slave station, said other slave station is allowed to issue an interrupt message including its own slave station address and station information within said interrupt enabling time zone, whereby upon appearance of the interrupt message on said distribution line within said interrupt enable time zone, sending of information of the other slave station which issued said interrupt message to the master station is allowed to be performed prior to that from said designated particular slave station within said interrupt enable time zone, while the sending of information of said designated particular slave station is delayed at least until the next call command is issued to said particular slave station from said master station.

4. A distribution system monitoring method according to claim 3, wherein said interrupt enable time zone is divided into a plurality of time sub-zones which are correspondingly correlated with types of changes in the state of the slave station, said types of state changes being allocated with priority levels in a sequential order in order to allow the slave stations which have undergone changes of state to issue interrupt messages in selected time sub-zones representing the priority levels correlated with the changes of state.

5. A distribution system monitoring method according to claim 4, wherein the priority level assigned to the change of the state of the slave station brought about by changing over of the pole switch from the open state to the closed state is set higher than the priority level assigned to the change of state of the slave station brought about by transition from a service interruption state to a service restoration state.

6. A distribution system monitoring method according to claim 3, wherein when the pole switch is automatically thrown into operative state upon transition of the associated slave station from the service interruption state to the alive state, the associated slave station is forcibly caused to stop issuance of the interrupt message brought about by the service interruption.

7. A distribution system monitoring method according to claim 4, wherein when the pole switch is automatically thrown into operative state upon transition of the associated slave station from the service interruption state to the alive state, said associated slave station is forcibly caused to stop issuance of the interrupt message brought about by the service interruption.

8. A signal transmission method for a system in which a master station and a plurality of slave stations are installed on and along a signal transmission line in such a manner that said master station and said slave stations are capable of performing mutual reception and transmission of information with said master station calling said slave stations through sequential polling, in response to which the called slave station sends reply information to said master station, comprising:
- a first step of setting as an initial value the identification number of a slave station to be monitored;
- a second step of activating a first timer for managing a period in which said slave station is called when said slave station number has been set at said first step;
- a third step for performing call transmission processing for the slave station to be monitored when said first timer is activated at said second step;
- a fourth step of activating a second timer for designating a reply transmission start time of the slave station upon completion of said call transmission processing at said third step;
- a fifth step of monitoring presence or absence of a reply, including a slave station address and station information, from a slave station following the activation of said second timer at said fourth step;
- a sixth step in which, when it is decided that a reply is present from a slave station at said fifth step, a decision is made as to whether or not the time point at which the reply transmission from said slave station was started lies within an interrupt enable time zone which is provided between a time when a call signal transmission from said master station has been completed and a time when a reply signal transmission from the slave station called by said master station is started;
- a seventh step in which, when a decision is made at said sixth step that the time at which the reply transmission from said slave station lies within said interrupt enable time zone, the slave station is identified as an interrupt slave station and data from the interrupt slave station is accepted by said master station; and
- an eighth step in which upon reception of the data from said interrupt slave station, processing related to the reply transmission from said interrupt slave station is executed.

9. A signal transmission method for a system in which a master station and a plurality of slave stations are installed on and along a signal transmission line in such a manner that said master station and said slave stations are capable of performing mutual reception and transmission of information with said master station calling said slave stations through sequential polling, in response to which the called slave station sends reply information to said master station, comprising:
- a first step of monitoring constantly a state in the slave station to be monitored;
- a second step of setting a "state change flag" when a decision is made at said first step that the state of the slave station being monitored has undergone a change;
- a third step of monitoring constantly the signal transmission line for a call from said master station when said "state change flag" has been set at said second step;
- a fourth step of receiving data from the master station at once when a decision is made at said third step that a call from said master station is present;
- a fifth step of deciding whether or not the call is for it's own destination upon reception of the data from said master station at said fourth step;
- a sixth step of checking whether or not the "state change flag" has been set, when it is decided at said fifth step that the call is not for it's own destination;
- a seventh step of starting transmission of an interrupt message, including a station address and station information, to said master station when it is decided at said sixth step that the "state change flag" has been set; and
- an eighth step of resetting the "state change flag" upon completion of the interrupt message transmission started at said seventh step.

10. A distribution system monitoring method according to claim 4, wherein upon issuance of an interrupt message from a given one of the slave stations which has undergone a change of state assigned with a high priority level, the sending of information to said master station by said given slave station is performed with priority, while the sending of information to said master station from a slave station which has undergone a state change assigned with a lower priority level is delayed at least until the next call command is issued thereto until another call command is issued thereto from said master station.

* * * * *